(12) United States Patent
Carruthers

(10) Patent No.: US 6,354,568 B1
(45) Date of Patent: Mar. 12, 2002

(54) SLIDING PLATE VALVE

(75) Inventor: Alec Carruthers, Nr Westbury (GB)

(73) Assignees: BG PLC; BG Intellectual Property Limited, both of Reading (GB)

( * ) Notice: Subject to any disclaimer, the term of this patent is extended or adjusted under 35 U.S.C. 154(b) by 0 days.

(21) Appl. No.: 09/623,871

(22) PCT Filed: Feb. 15, 1999

(86) PCT No.: PCT/GB99/00471

§ 371 Date: Nov. 6, 2000

§ 102(e) Date: Nov. 6, 2000

(87) PCT Pub. No.: WO99/46525

PCT Pub. Date: Sep. 16, 1999

(30) Foreign Application Priority Data

Mar. 11, 1998 (GB) .............................................. 9805120

(51) Int. Cl.$^7$ ................................................. F16K 3/00
(52) U.S. Cl. ........................ 251/328; 251/326; 251/333; 251/334; 251/1.1; 174/47
(58) Field of Search .......................... 251/1.1, 1.3, 282, 251/326, 327, 333, 334; 174/47

(56) References Cited

U.S. PATENT DOCUMENTS

| | | | | |
|---|---|---|---|---|
| 1,788,763 A | * | 1/1931 | Grant et al. | |
| 1,953,828 A | * | 4/1934 | Johnson | |
| 5,287,879 A | * | 2/1994 | Legget et al. | 137/246.22 |
| 5,833,208 A | * | 11/1998 | Lee, Jr. | 251/1.3 |

* cited by examiner

Primary Examiner—Kevin Shaver
Assistant Examiner—David A Bonderer
(74) Attorney, Agent, or Firm—Oblon, Spivak, McClelland, Maier & Neustadt, P.C.

(57) ABSTRACT

A plate valve which includes two sliding plates and which carries seal portions with an elongated slot. A valve body of the plate valve includes a second elongated slot with further seal portions extending from a valve aperture. A cable of different diameters can be accommodated and sealed by the cooperating resilient seal portions.

9 Claims, 5 Drawing Sheets

PRIOR ART FIG. 1.
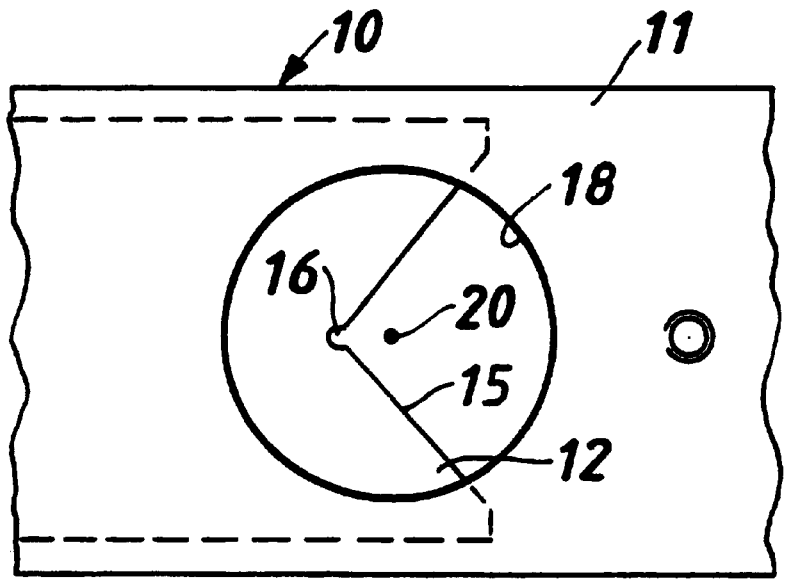
PRIOR ART FIG. 2.
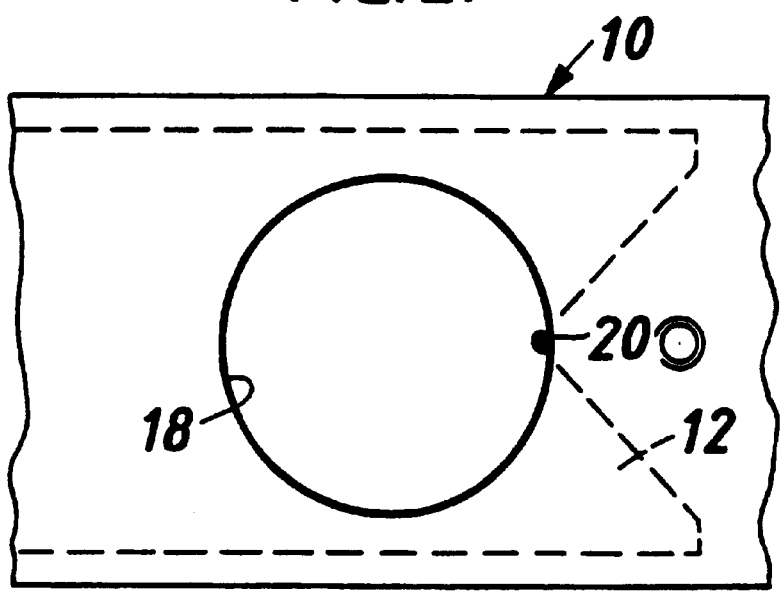

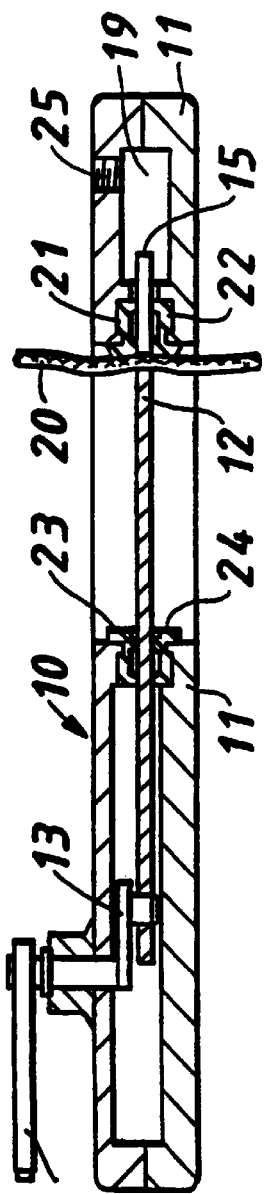
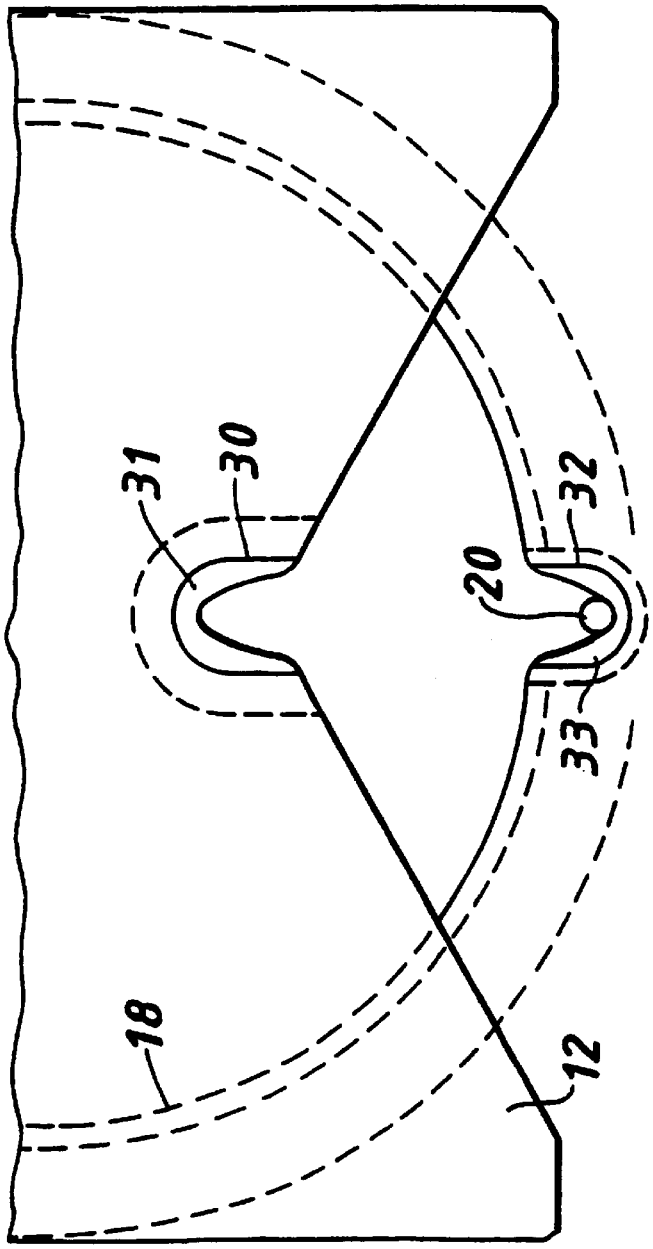

SLIDING PLATE VALVE

BACKGROUND OF THE INVENTION

The invention relates to a sliding plate valve of the type used in the gas industry, for example.

FIELD OF THE INVENTION

Sliding plate valves are extensively used to provide a low profile mechanism to isolate main pipes for gas and water. In addition they can be used as an entry point for mains inspection for the passage of a camera, for example, through the pipe. Where a tow line or camera signal cable is to move through a pipeline, it is necessary, where fluid under pressure is still present in the pipeline, to provide such access for such cables under sealed conditions.

A sliding plate valve suitable for such situations as disclosed in UK patent number GB 2 261 277 which employs a notch and seal arrangement to trap such a cable while sealing the pipe by means of the plate valve. The present invention is concerned with providing improvements over such a configuration.

DISCUSSION OF THE BACKGROUND

According to the invention there is provided a plate valve having a bore for passage of a fluid; a sliding plate for closing the bore, a first recessed seal portion on the valve body extending from the bore and a second recessed seal portion on the sliding plate adapted to cooperate with a cable or the like to effect a seal with the cable and the first seal portion on closure of the plate. In a preferred embodiment two slide plates are provided each with an associated first and second recessed seal portion.

The plate valve may include an incorporated equalisation valve.

SUMMARY OF THE INVENTION

The invention will now be described by way of example according to the accompanying drawings in which:

BRIEF DESCRIPTION OF THE DRAWINGS

FIG. 1 shows the known valve plate arrangement in the open position;

FIG. 2 shows the known plate arrangement in a position sufficiently closed so as to seal around the cable;

FIG. 3 shows a sectional view through the plate valve showing the cable sealed against the valve body;

FIG. 4 shows an alternative embodiment the subject of the present invention, which has a resilient recessed portion for the cable which cooperates with a resilient recessed portion on the plate valve;

DESCRIPTION OF THE PREFERRED EMBODIMENTS

Figure 5:
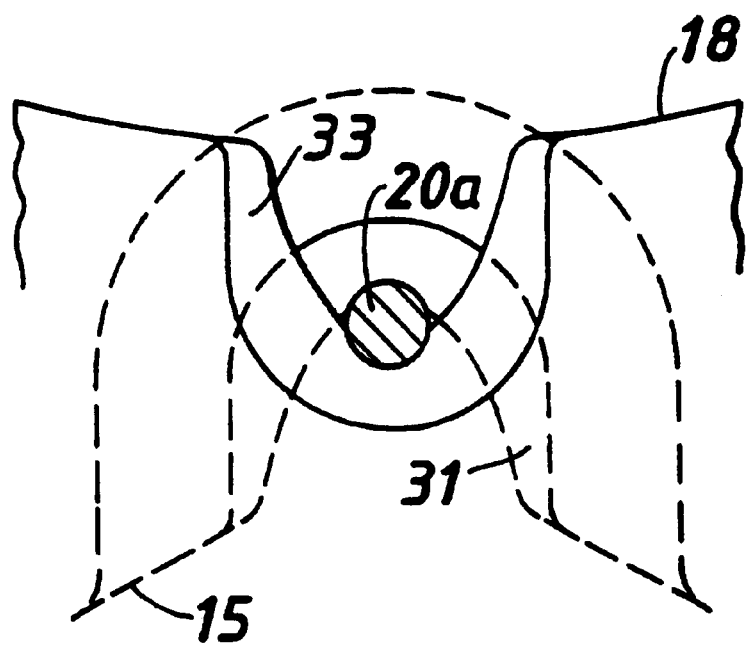
FIG. 5 shows the sealing mechanism of FIG. 4 around a small cable.

The arrangement of FIGS. 1 to 3 corresponds to the device shown in Patent No. GB 2 261 277 B. The plate valve 10 includes a body portion 11 with a circular aperture 18 therethrough and a sliding plate 12 operable by means of a linkage 13 and handle 14. The plate 12 incorporates, on its front face, a 'V' shaped portion 15 terminating in a semi-circular notch 16 which will hold the cable 20 in use.

As shown in FIG. 1, operation of the plate will cause the cable 20 to move into the notch 16 and become trapped against the dual seals 21, 22 on the valve body 11 (see FIG. 3). If the cable had not been present the plate would have moved farther inside chamber 19 so that the notch 16 would be filly within the chamber to seal the plate even without a cable present.

It is seen that the seals 21 and 22 seal both the plate and the cable. The seal parts 23 and 24 of the circular seals will seal the plate towards the linkage mechanism. A vent/purge aperture 25 allows release of fluid, for example, which would otherwise become trapped in the chamber 19.

In the improved arrangement shown in FIG. 4 the plate carries its own cable seal and the main body sealed portion is recessed to extend the seal outside of the main bore portion to prevent damage to the seal when equipment is passed through the plate valve. It also allows different cable thickness to be more readily handled.

As shown in FIG. 4, the plate 12 has been modified by providing an elongate slot 30 in the centre of the 'V' shaped portion 15. The slot 30 carries a generally semi-elliptical resilient seal portion 31 (e.g. thermo-plastic rubber) which will deform when in contact with the cable. At the body portion 11 of the valve at the periphery of the bore aperture 18, a second elongate slot 32 is provided extending into the body portion 11 away from the bore to provide a recess outside the bore. This also carries a resilient seal portion 33.

In operation, when a relatively small diameter cable 20a is utilized, the valve plate will close around the cable in the manner shown in FIG. 5.

Figure 6:
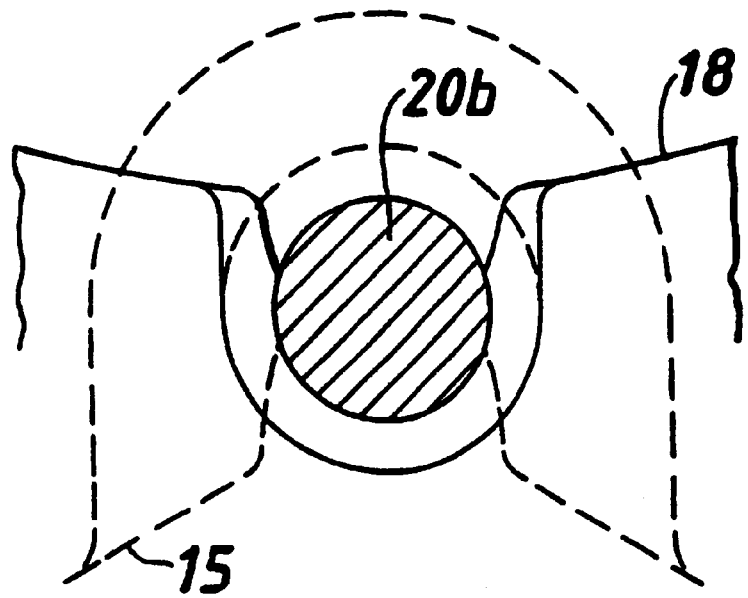
FIG. 6 shows the sealing mechanism of FIG. 4 around a larger diameter cable.

In the event that a larger diameter cable 20b is passed through the valve, see FIG. 6, on closure, the cable can still be accommodated without intruding into the bore. The resilient seal portions 31 and 33 will deform to effect the seal.

Figure 7:
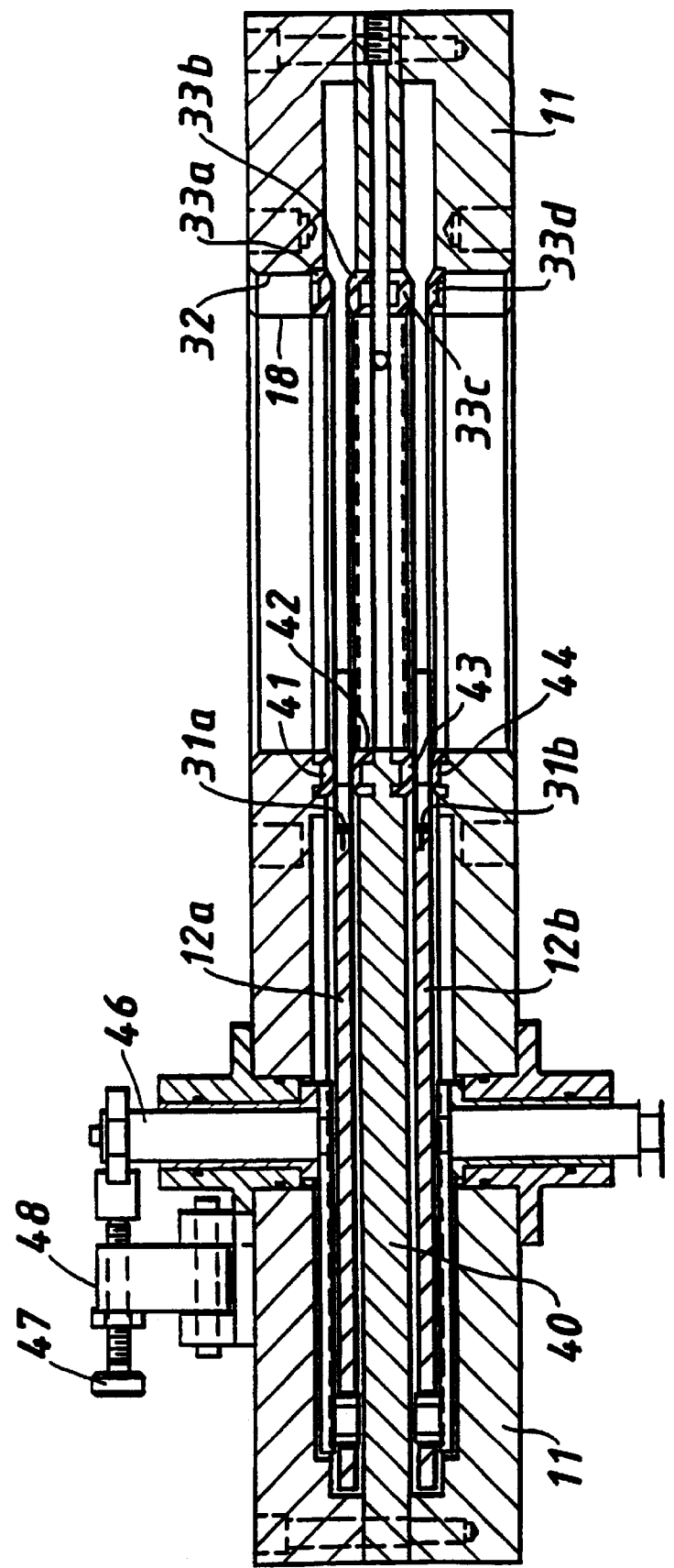
FIG. 7 shows a dual slide plate version of the plate valve.

In a further modification, incorporating the above noted structure, a dual gate version with two plates is employed as shown in FIG. 7. Here, two sliding plates 12a, 12b move over a central body (plate) portion 40. Seals 41 and 42 cooperate with sliding plate 12a and seals 43 and 44 cooperate with sliding plate 12b. The slot 32 extending into the body portion away from the fluid bore has seal portions 33a–d provided which cooperate with the cable if present or the slide plates 12a, 12b above if no cable is present to effect the seal.

The dual plates 12a, 12b slide forward and back under the control of drive mechanism 46 which terminates in handle 47. A latch 48 can be moved into contact with handle 47 to hold the valve in the desired position. The dual plates provide extra safety when dealing with high pressure fluids because even if one seal partially fails, sufficient sealing in the valve is still provided. When a cable is present, even if there is some slight passage of fluid around the first seal into the chamber area, the second seal is very effective as the pressure difference around the second seal is much lower.

Figure 8:
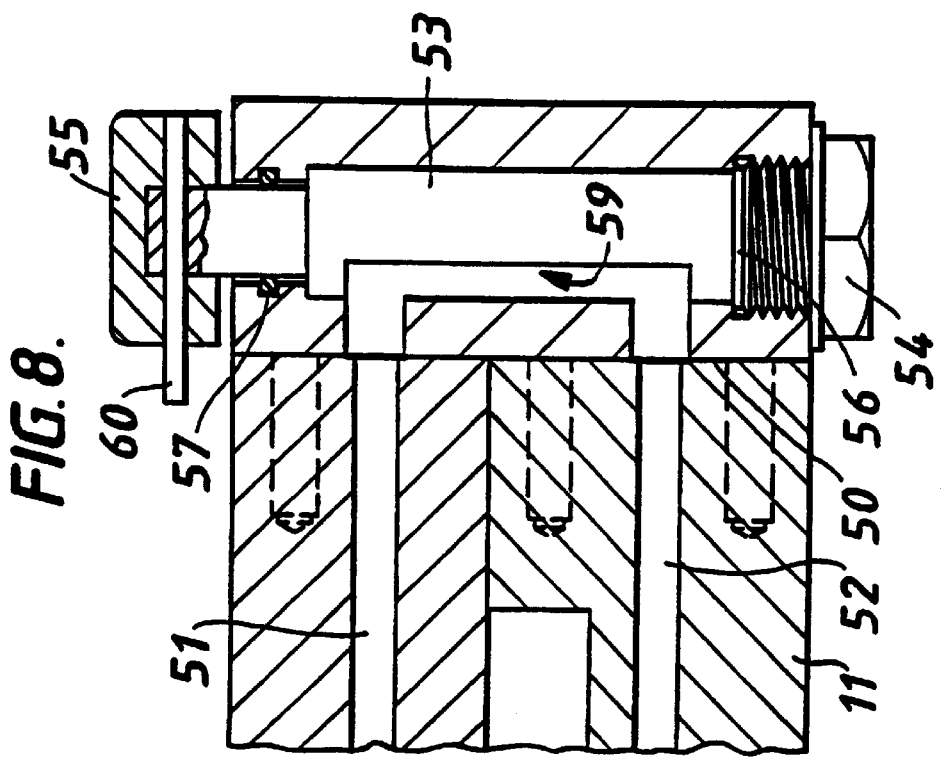
FIG. 8 shows a detail of the plate valve with a pressure equalization valve for use in the FIG. 4 embodiment.

In a modified version of FIG. 4, illustrated in FIG. 8, an equalization valve is incorporated to equalize pressure between the valve inlet and outlet prior to opening the slide valve.

As shown in FIG. 8, the body 11 has an equalization valve portion 50 mounted thereon and includes bores 51 and 52 extending into the body to facilitate a passage to the main bore 18. The equalization valve includes a generally cylindrical valve portion 53 which terminates at plug 54 at the lower end and a cap 55 at the upper end. A pad 56 and an O-ring seal 57 assist in sealing.

The valve portion 53 includes an inset channel portion 59 which, when the portion 53 is rotated, can complete the path through the bores 51 and 52 for equalization purposes.

An indicator extension 60 in the cap 55 shows the rotational position of the valve spindle 53. When closed the face of spindle 53 blocks the passage between bores 51 and 52.

Figure 9:
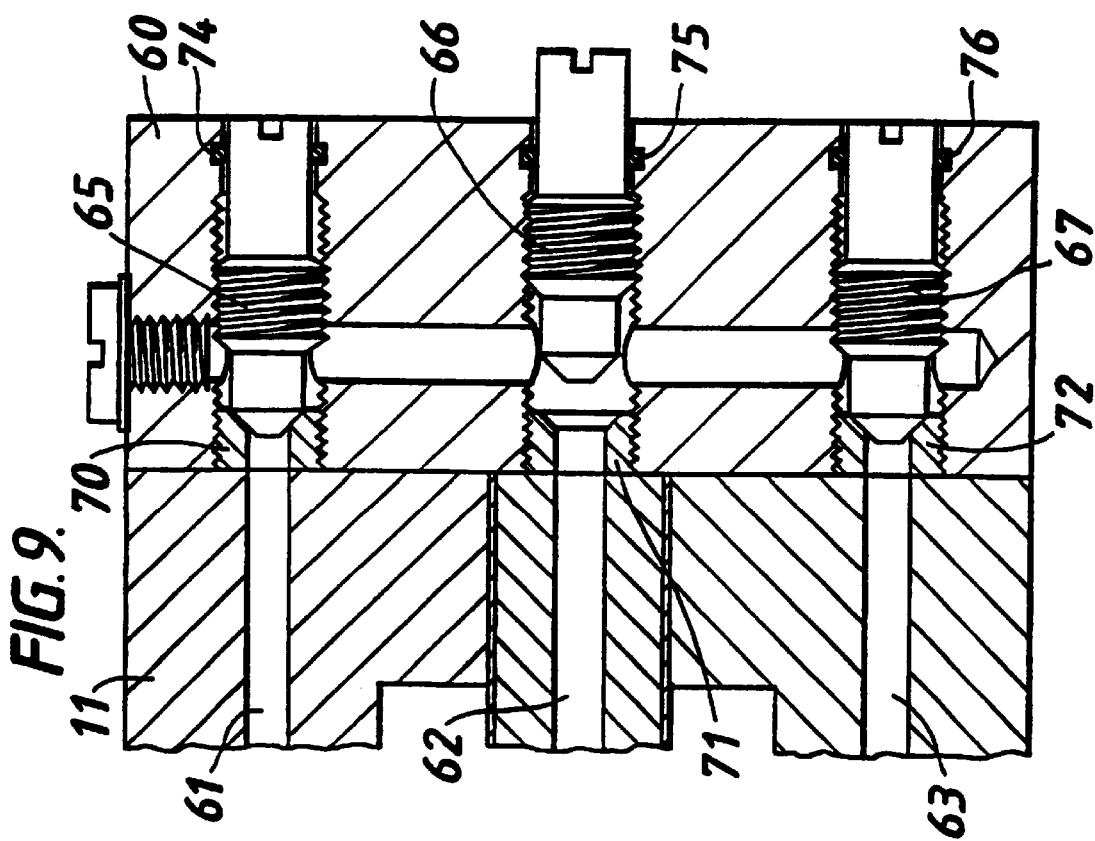
FIG. 9 shows the details of the plate valve with an added equalization valve for use with the dual plate configuration.

In a further modification shown in FIG. 9, the equalization valve can operate with the dual plate version of the plate valve of FIG. 7.

The equalization valve 60 of FIG. 9 mounted on the plate valve, extends in to plate valve body 11 and includes bores 61, 62, 63 passing into the body to couple with the main bore 18.

Triple valve spindle segments 65, 66 and 67 with associated seats 70, 71 and 72 respectively, are moveable to open a passage between the inlet and outlet of the plate valve via bore 73. Each valve segment includes a seal 74,75 and 76 respectively to prevent fluid leakage.

What is claimed is:

1. A plate valve having a bore for passage of a fluid;

a sliding plate for closing the bore, a first recessed seal portion on the valve body extending away from the bore to a position located outside the bore and a second recessed seal portion on the sliding plate adapted to cooperate with a cable to effect a seal with the cable and the first seal portion on closure of the plate.

2. A valve as claimed in claim 1, wherein the first and second seal portions include a resilient insert.

3. A valve as claimed in claim 1, which comprises a pair of sliding plates each with an associated first and second recessed seal portion.

4. A valve as claimed in claim 3, including a center plate portion with an aperture forming part of the bore between the sliding plates and seal means mounted on a recessed portion of the center plate to cooperate with the cable to assist in sealing the cable.

5. A valve as claimed in claim 3, which comprises a tandem operating mechanism for controlling movement of the slide plates.

6. A valve as claimed in claim 5, which comprises locking means for holding the valve operating mechanism in a set position.

7. A valve as claimed in claim 4, wherein the valve body and the center plate each includes a pair of resilient seals for effecting a seal on the major surfaces of each sliding plate.

8. A valve as claimed in claim 1, which comprises an equalizing valve mechanism in communication with the bore plate valve.

9. A valve as claimed in claim 8, wherein the equalization valve comprises at least two passages for connection to the plate valve bore and valve means for selectively connecting the at least two passages when equalization is required.

* * * * *